(12) United States Patent
Lin et al.

(10) Patent No.: US 11,921,806 B2
(45) Date of Patent: Mar. 5, 2024

(54) REARRANGING TAGS ON A GRAPHICAL USER INTERFACE (GUI) BASED ON KNOWN AND UNKNOWN LEVELS OF WEB TRAFFIC

(71) Applicant: MFTB Holdco, Inc., Seattle, WA (US)

(72) Inventors: Sangdi Lin, Seattle, WA (US); Anish Khazane, Seattle, WA (US); Zachary Harrison, Seattle, WA (US); Philip Foeckler, Seattle, WA (US); Saeid Balaneshinkordan, Seattle, WA (US); Joshua Urbanovsky, Seattle, WA (US); George Busby, Seattle, WA (US); Ondrej Linda, Seattle, WA (US); Siddhi Vakil, Seattle, WA (US); Joshua Gnanayutham, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 53 days.

(21) Appl. No.: 17/859,918

(22) Filed: Jul. 7, 2022

(65) Prior Publication Data
US 2024/0012865 A1 Jan. 11, 2024

(51) Int. Cl.
G06F 16/00 (2019.01)
G06F 16/9538 (2019.01)
G06F 16/958 (2019.01)
G06Q 30/0601 (2023.01)

(52) U.S. Cl.
CPC ........ G06F 16/9538 (2019.01); G06F 16/958 (2019.01); G06Q 30/0643 (2013.01); G06Q 50/163 (2013.01)

(58) Field of Classification Search
CPC .................................................. G06F 16/9538
See application file for complete search history.

(56) References Cited

U.S. PATENT DOCUMENTS

2016/0027051 A1* 1/2016 Gross ..................... G06V 20/20
705/14.54

\* cited by examiner

*Primary Examiner* — Ajith Jacob
(74) *Attorney, Agent, or Firm* — Perkins Coie LLP

(57) ABSTRACT

Systems and methods for rearranging tags on a graphical user interface (GUI) based on known and unknown levels of web traffic are disclosed. To provide users with real estate listings that have popular home attributes with respect to a given region, the system uses known user interaction information to determine predicted user interaction information for real estate listing phrases (e.g., tags) that are associated with unknown user interaction information. The system then ranks the real estate listing phrases based on each real estate listing phrase's user interaction information. Based on the ranked real estate listing phrases, the system generates for display the highest ranked real estate listing phrase in association with a real estate listing being associated with the real estate listing phrase.

20 Claims, 7 Drawing Sheets

600

| model.findSimilar('phrase_1',6) | |
|---|---|
| Phrase | Similarity |
| 'phrase_2' | 0.999999999 |
| 'phrase_3' | 0.988871922 |
| 'phrase_4' | 0.988861123 |
| 'phrase_5' | 0.942554234 |
| 'phrase_6' | 0.921432511 |
| 'phrase_7' | 0.812351552 |

FIG. 6

REARRANGING TAGS ON A GRAPHICAL USER INTERFACE (GUI) BASED ON KNOWN AND UNKNOWN LEVELS OF WEB TRAFFIC

BACKGROUND

Real estate databases often use image recognition and natural language processing to tag real estate listings with various home attributes. Although this may provide an end user, such as a real estate customer, a method to search real estate properties, such tags may not be popular with respect to a given region. For example, customers may seek homes with certain attributes that are popular with respect to a certain region. Currently, real estate databases have no mechanism to determine which attributes may be popular with respect to a given area, or which tags (e.g., popular tags) should be tagged in association with a real estate listing that allow customers to quickly identify (e.g., via a user interface) a suitable home for the customer. These and other drawbacks exist.

BRIEF DESCRIPTION OF THE DRAWINGS

FIG. 6 shows a table illustrating the similarity between one or more real estate listing phrases, in accordance with some implementations of the present technology.

Figure 1:
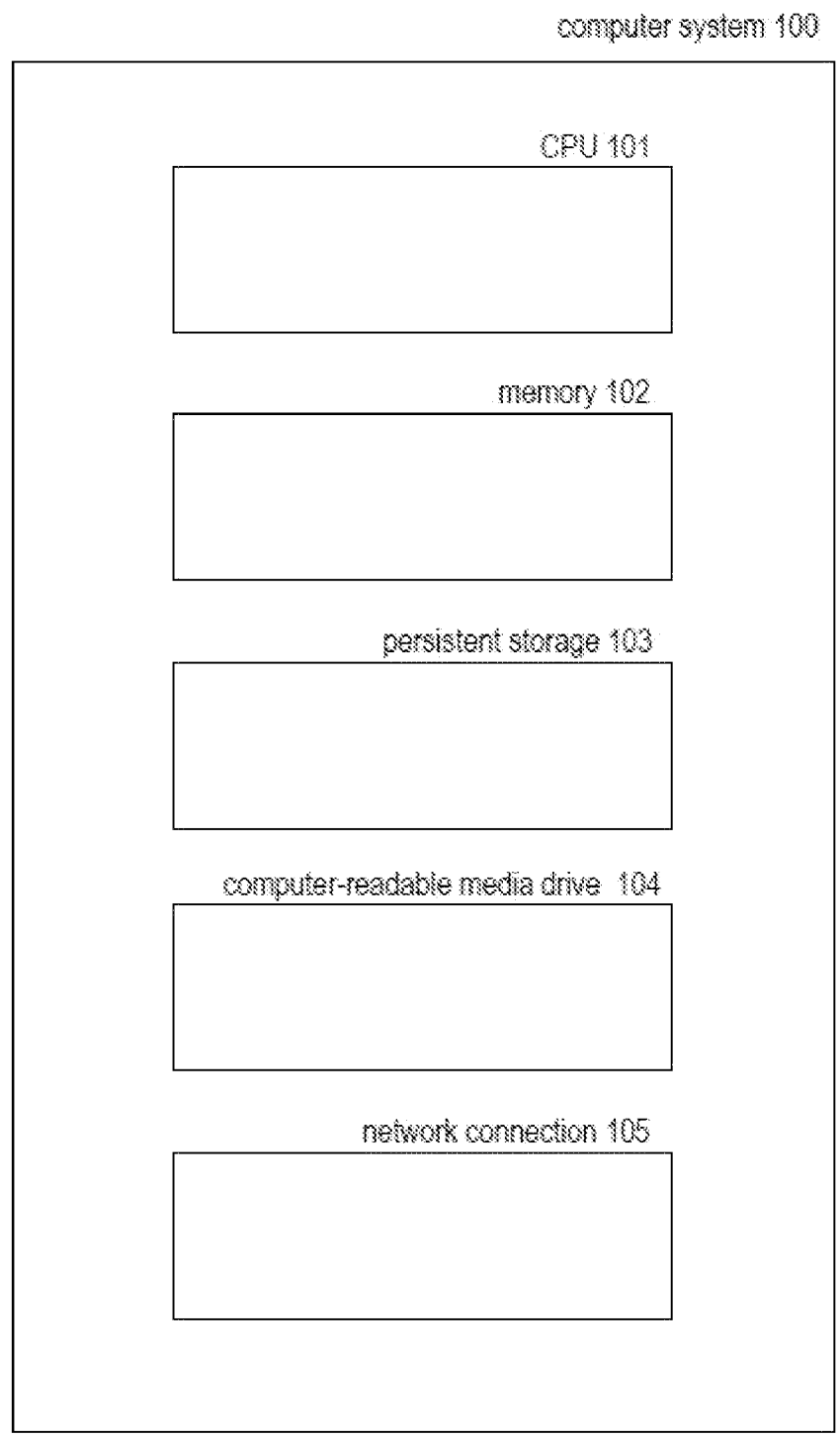
FIG. 1 is a block diagram showing some of the components typically incorporated in at least some of the computer systems and other devices on which the disclosed system operates in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Customers often find difficulty finding the most suitable home when searching properties via real estate listing search engines. For example, a customer may search for homes based on region, price, home attributes, lot size, square-footage, or other search filters. Although this can narrow the search results to homes of interest, often times the customer may only be presented with a limited amount of information for each search result and is required to manually click on each individual search result to identify the most suitable home. Additionally, on such search result page (e.g., displaying a list of properties the user has searched for), popular features of the home with respect to a particular region are often left out. For example, some customers are in a position to move from one coast of the U.S. to the other coast with limited knowledge of what home features are popular with respect to a region. This can impact the home's resale value when the customer goes to sell their home if the home does not have a popular home attribute associated with the property.

There is a need for determining, with respect to a given region, popular home attributes of real estate listings and which home attributes to feature on a user interface such that customers are easily able to identify the most suitable homes. Conventional systems sometimes leverage natural language processing and image recognition algorithms to tag real estate listings with home attributes, however, such systems do not have a mechanism to determine which home attributes with respect to a given region are popular or which home attributes to feature with respect to a real estate listing. Additionally, even when certain home attributes are known to be popular (e.g., via user interaction data), other home attributes may be semantically similar without having any user interaction data. For example, the home attribute "water front" may be associated with a level of webpage traffic, however "lake front" may not be. Thus, there is a need to determine a level of user interaction data for similar home attributes that have no associated level of user interaction data to effectively tag real estate listings.

To overcome these and other deficiencies of existing systems, the inventors have developed a system for determining popular real estate attributes with respect to a given region, determining an estimated level of user interaction with real estate attributes that have no known associated level of user interaction data, and determining which real estate attributes to feature for a given real estate listing in the respective region. Moreover, upon determining the popular real estate attributes (e.g., based on a known or estimated level of user interaction data) and determining which ones to feature with respect to a real estate listing, the inventors have developed an improved user interface such that a user may easily identify homes of interest without wasting computer processing resources by manually interacting with each real estate listing on a real estate listing search result page.

For example, due to the amount of searching that is performed by a user to identify real estate listings of interest, there is often a large amount of time spent and computer resources required (e.g., such as memory, processing power, or other computer resources) to identify these real estate listings of interest to a user. For instance, as discussed above, conventionally, a user is required to click on each and every real estate listing to view home attributes associated with each real estate listing. This wastes valuable computer processing resources and causes computer network lag as a computer system must process each and every request (e.g., request to view each real estate listing). Additionally, customers may be ignorant to home attributes may be popular with respect to a given region, which, if purchased, can affect the resale value of the home in the future. Furthermore, such popular attributes may not be displayed in a accessible format to allow customers to easily view home attributes that are popular, thus increasing the amount of time spent and computer resources required.

In various implementations, the methods and systems described herein can determine popular home attributes with respect to a given region based on known user interaction values. Using the known user interaction values, the methods and systems determine an estimated user interaction value for other home attributes that are associated with an unknown level of user interaction value, where the other home attributes are semantically similar to the popular home attributes associated with a known user interaction value. Using the known levels and unknown levels of user interaction values of the home attributes, the methods and systems can tag real estate listings (e.g., located in the given region) with home attributes that are deemed the most popular. Additionally, such home attribute tags are presented in a user interface to allow prospective customers to easily identify homes of interest to them, while reducing the amount of computer resources needed to identify the most suitable home for a customer.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram showing some of the components typically incorporated in at least some of the computer systems and other devices on which the disclosed system operates. In various implementations, these computer systems and other devices 100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 (e.g., at least one non-transitory computer-readable medium) that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
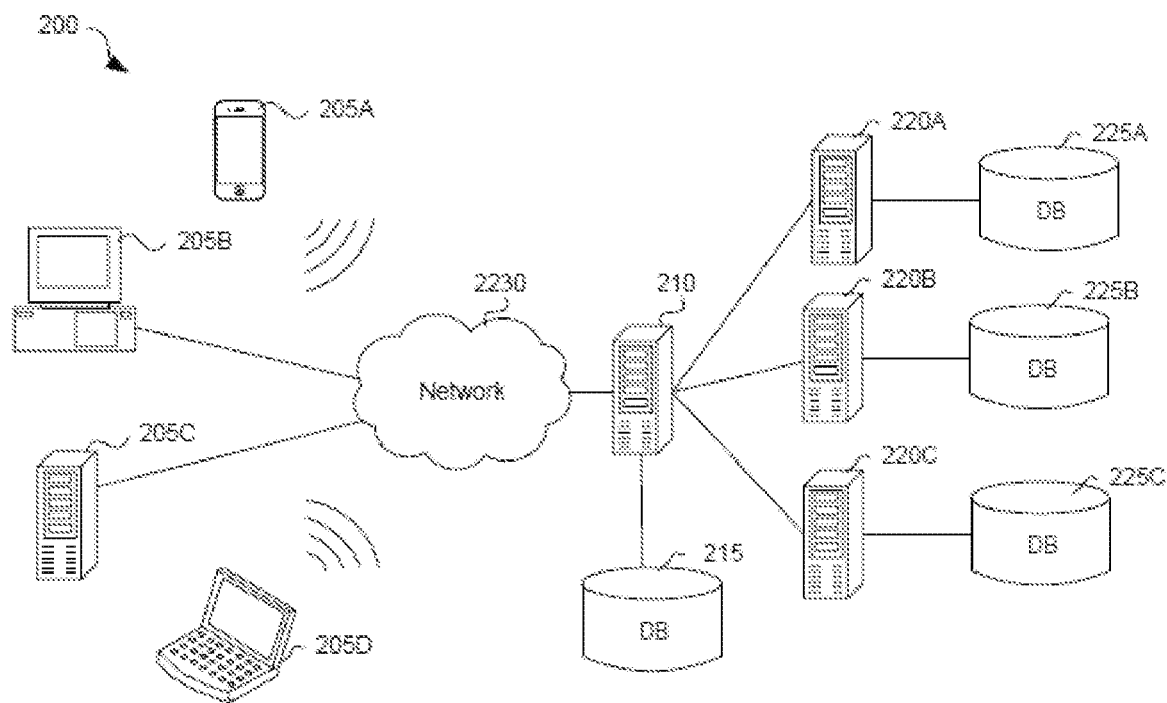
FIG. 2 is a system diagram illustrating an example of a computing environment in which the disclosed system operates in some implementations of the present technology.

FIG. 2 is a system diagram illustrating an example of a computing environment in which the disclosed system operates in some implementations. In some implementations, environment 200 includes one or more client computing devices 205A-D, examples of which can host the system 100. For example, the computing devices 205A-D can comprise distributed entities 1-4, respectively. Client computing devices 205 operate in a networked environment using logical connections through network 2230 to one or more remote computers, such as a server computing device.

In some implementations, server computing device 210 is an edge server which receives client requests and coordinates fulfillment of those requests through other servers, such as servers 220A-C. In some implementations, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as real estate listings, home information, recent sales, home attributes, particular homes, subject homes, comparable homes, home data, actual values of homes, predicted values of homes, automated valuation models, model data, training data, test data, validation data, confidence scores, predicted errors, one or more machine learning models, confidence models, confidence bins, partitions of homes, error distributions, conversion functions, confident home values, confident homes, updated confidence scores, updated predicted values of homes, calibrated confidence scores, calibration models, isotonic regression models, confidence selector models, most confident predicted values, ensemble models, synthetization/aggregation functions, not-easily-explainable or not-easily-interpretable models, explainable or interpretable models, confident valuation models, predefined ranges, predefined thresholds, error thresholds, graphical representations, requests for valuations, interquartile ranges of actual values, quantiles of actual values, upper quartiles of actual values, lower quartiles of actual values, bin threshold values, market or location, time or seasons, types of homes, model performance, confidence bin performance, sale prices, listing prices, and so on.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set. The training data or training set can be created by generating pairs of features (e.g., feature vectors) and/or ground-truth labels/values based on any of the data stored in databases 215 and 225. During training, the machine learning models can be adjusted or modified to fit the models to the training data by, e.g., adjusting or modifying model parameters, such as weights and/or biases, so as to minimize some error measure (e.g., a difference between a predicted value and an actual/ground-truth value, a difference between a predicted real estate listing phrase and actual/ground-truth real estate listing phrase, etc.) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 215 and 225 (e.g., unlabeled data to generate predictions for). In some implementations, the machine learning models can be retrained to further modify/adjust model parameters and improve model performance. The machine learning models can be retrained on existing and/or new training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 215 and 225 are displayed logically as single units, databases 215 and 225 can each be a distributed computing environment encompassing multiple computing devices, can be located within their corresponding server, or can be located at the same or at geographically disparate physical locations.

Network 2230 can be a local area network (LAN) or a wide area network (WAN), but can also be other wired or wireless networks. In some implementations, network 2230 is the Internet or some other public or private network. Client computing devices 205 are connected to network 2230 through a network interface, such as by wired or wireless communication. While the connections between server computing device 210 and server computing device 220 are shown as separate connections, these connections can be any kind of local, wide area, wired, or wireless network, including network 2230 or a separate public or private network.

Generating Contextually Embedded Real Estate Phrases

Figure 3:
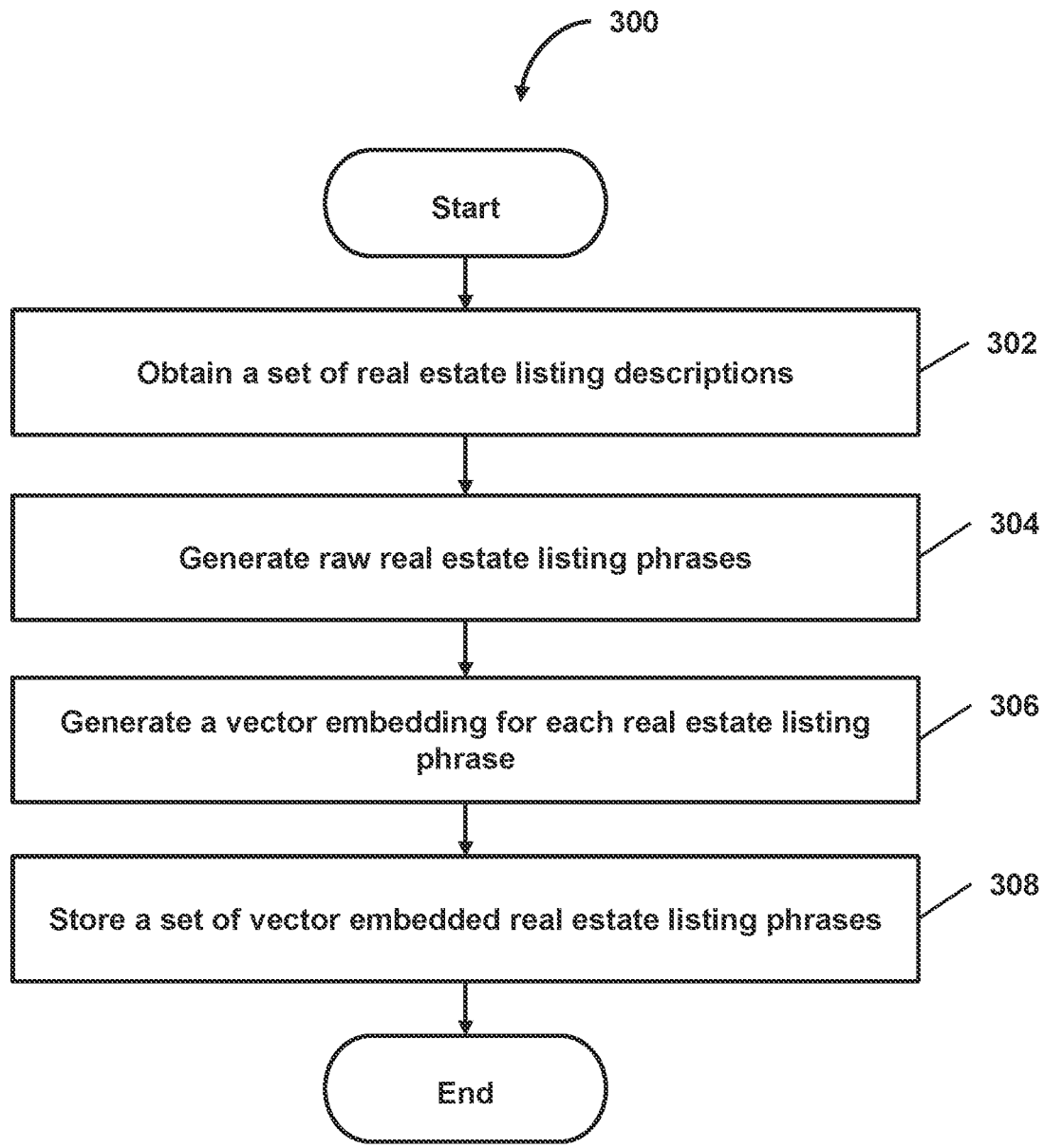
FIG. 3 is a flow diagram illustrating a process of generating contextually embedded real estate listing phrases, in accordance with some implementations of the present technology.

FIG. 3 is a flow diagram illustrating a process 300 of generating contextually embedded real estate listing phrases, in accordance with some implementations of the present technology. At act 302, process 300 performs obtaining a set of real estate listing descriptions. For example, process 300 can obtain a set of real estate listing descriptions from real estate listings that are associated with a geographic region. The set of real estate listing descriptions can be obtained from a remote data store, such as real estate database (e.g., database 215 of FIG. 2). The real estate database can store real estate-related data such as real estate listings, real estate listing descriptions, real estate listing images, user interaction data, or other real estate-related information.

To improve a user's experience via an improved user interface by displaying popular real estate listing phrases corresponding to a geographic area or by displaying rearranged real estate listing phrases associated with real estate listings, contextual information surrounding real estate phrases within real estate descriptions is advantageous to acquire. For example, when users are looking for real estate properties in Miami, Florida, a popular home attribute may be "Clay Shingles." However, in some real estate descriptions, there may be differing real estate phrases that use similar words such as "Clay Basement" or "Tar Shingles." Contextual information surrounding such information is useful when generating real estate listing phrases because such "Clay Basement" or "Tar Shingle" real estate phrases may be typos or otherwise inaccurate. Additionally, some real estate listing descriptions can have the same or similar real estate phrases in a real estate description, but the context in which such real estate listing phrases are used may have a different meaning based on contextual information in the real estate listing description. For example, the real estate listing phrase "Clay Shingle" can have contextual information in a first real estate listing description indicating that the clay shingle roof needs to be replaced, whereas a second real estate listing description may indicate that the clay shingle roof does not need to be replaced. Thus, to generate accurate real estate phrases to be used for display with real estate listings, it is advantageous to capture the contextual information associated with real estate listing descriptions. Moreover, as the real estate listing descriptions can include real estate listing phrases of interest, by rearranging such real estate listing phrases for display in association with a real estate listing (e.g., on a real estate listing image, thumbnail, or photocard), the user experience is improved as users can easily identify real estate listings of interest. Therefore, process 300 may capture contextual information surrounding such real estate phrases to account for any errors in real estate descriptions to ensure proper or correct real estate listing phrases are being generated.

At act 304, process 300 generates a set of raw real estate listing phrases. For example, process 300 can generate a set of raw real estate listing phrases for each real estate listing description associated with the geographic region. For instance, process 300 provides each real estate listing description associated with the geographic area to a machine learning model to generate the set of raw real estate listing phrases. The machine learning model can be any machine learning model configured to generate raw real estate listing phrases such as a Neural Network, Convolutional Neural Network, a Recurrent Neural Network, a Support Vector Machine, a Part of Speech Tagging model, Natural Language Processing model, collocation detection model, or other machine learning model. The raw real estate listing phrases indicate real estate listing phrases that are tokenized phrases from the real estate listing descriptions associated with the geographic region. In some implementations, process 300 trains the machine learning model on the set of real estate listing descriptions associated with the geographic region (e.g., the real estate listing descriptions obtained in act 302).

In some implementations, the machine learning model is a collocation detection model. The collocation detection model can be a pretrained machine learning model obtained via a remote data store. For example, the remote data store can be the same or similar to database 225 of FIG. 2. Such remote data store can include the collocation detection model stored in an online library such as gensim. The gensim library may be an online source code library including a variety of machine learning models, such as, but not limited to a collocation detection model named Phraser. Process 300 obtains the Phraser model from the remote data store and then provides the Phraser model with the set of real estate listing descriptions associated with the geographic region. In some implementations, the Phraser model is configured to output a set of raw real estate listing phrases that are bi-gram or tri-gram phrases. That is, a bi-gram phrase is a phrase that includes two words such as "renovated kitchen," "clay shingles," "water front," or other two word phrases. Additionally, a tri-gram phrase is a phrase that includes three words such as "newly renovated kitchen," "big attic space," "close to parks," or other three word phrases.

As an example, the Phraser model extracts, from the set of real estate listing descriptions, bi-gram or tri-gram phrases. Such bi-gram or tri-gram phrases (e.g., raw real estate listing phrases) can be used to generate real estate phrase vector embeddings, as will be discussed later. As the Phraser model is provided with real estate listings that are specific to a geographic region, the Phraser model outputs raw real estate listing phrases that are specific to the geographic region. For instance, the outputted set of raw real estate listing phrases may vary from region to region as real estate properties located in California are more likely to include "swimming pool" than those located in Alaska.

In some implementations, the machine learning model can be a BERT model. The BERT model may be a bidirectional encoder representations from transformers model. For example, the BERT model can be a pretrained model obtained via a remote data store. For example, the remote data store can be the same or similar to database 225 of FIG. 2. Process 300 can obtain the BERT model from the remote data store and may provide the BERT model with the set of real estate listing descriptions associated with the geographic region. In some implementations, the BERT model is configured to output a set of raw real estate listing phrases from the set of real estate listing descriptions. For instance, the BERT model can be provided with a real estate listing description from the set of real estate listing descriptions associated with the geographic region, and then tokenizes each word of the real estate listing description. The advantage of using a BERT model is the configuration of the model itself. For instance, the BERT model is configured to be attentive to the context of each individual word in the real estate listing description. As an example, although words or phrases in a real estate listing description may be similar, the words or phrases may have different meanings such as "kitchen needs renovating" or "renovated kitchen." As the configuration of the BERT model captures the context of nearby words (e.g., words that are within 1 word, 2 words, 3 words, etc.), the BERT model accurately outputs a set of raw real estate listing phrases that are likely to indicate a home attribute (e.g., renovated kitchen) as opposed to another phrase that may not indicate a home attribute (e.g., kitchen needs renovating).

At act 306, process 300 generates a vector embedding for each real estate listing phrase. For example, process 300 can use another machine learning model to generate a vector embedding for each raw real estate listing phrase (e.g., obtained via act 304). In some implementations, the other machine learning model can be a Neural Network, Convolutional Neural Network, a Recurrent Neural Network, a Support Vector Machine, Natural Language Processing model, Fasttext model, Word2Vec model, BERT model, or other machine learning model configured to generate a vector embedding of a real estate listing phrase. The vector embedding indicates a vector representation of each raw tag as a numerical vector. For instance a raw real estate listing phrase of "renovated kitchen" may have a vector embedding of [1.0, 3.0, 2.5]. It should be noted, that the vector embedding previously described is merely exemplary and that each raw real estate listing phrase can have differing vector embeddings, and such vector embeddings may have more or less numerical values per each vector embedding representation of each real estate listing phrase.

Process 300 can obtain the other machine learning model from a remote data store (e.g., the same or similar to database 215). In some implementations, process 300 trains the other machine learning model on the set of real estate listing descriptions associated with the geographic region (e.g., the real estate listing descriptions obtained in act 302). Where the other machine learning model is trained on real estate listing descriptions that are specific to the geographic region, the other machine learning model generates a vector space where each word or phrase included in each real estate listing description of the set of real estate listing descriptions are mapped to a vector embedding. Process 300 then provides the set of raw real estate listing phrases (e.g., obtained via act 304) to the other machine learning model to generate a vector embedding for each raw real estate listing phrase of the set of raw real estate listing phrases.

In this way, since the other machine learning model is trained on real estate listing descriptions that are specific to the geographic region, the vector embeddings generated are specific to the geographic region. That is, as opposed to training the other machine learning model on real estate listing descriptions that are not associated with the geographic region (or alternatively, varying geographic regions), the vector embeddings of words or phrases in the real estate listing description account for contextual information of nearby words such that word/phrase vectors are positioned in the vector space that share common context. Furthermore, in this way, although real estate listing phrases may share common words, similar real estate phrase vector embeddings are based on the context in which they are used as opposed to merely a string match—thereby improving the accuracy of determining which real estate listing phrases are semantically similar.

At act 308, process 300 stores a set of vector embedded real estate listing phrases. For example, process 300 can store the vector embedded real estate listing phrases (e.g., generated via act 306) in a real estate database (e.g., the same or similar to database 215 of FIG. 2). In some implementations, process 300 stores the vector embedded real estate listing phrases as a set, where the set is associated with the geographic region. In this way, the set of vector embedded real estate listings are easily obtained based on the geographic region to which they are associated with.

It should be noted that process 300 can be repeated based on a predetermined time frame. For example, in some implementations, process 300 can repeat based on a predetermined time frame such as once every hour, once every day, once every month, once every year, or other predetermined time frame. Additionally, process 300 can be repeated for other geographic regions. For instance, based on a user input (e.g., a user searching for real estate listings that correspond to a geographic region the user has inputted, a search query, etc.), process 300 can repeat based on the geographic region a user has provided.

Rearranging Real Estate Listing Phrases and Improving Related User Interfaces

Figure 4:
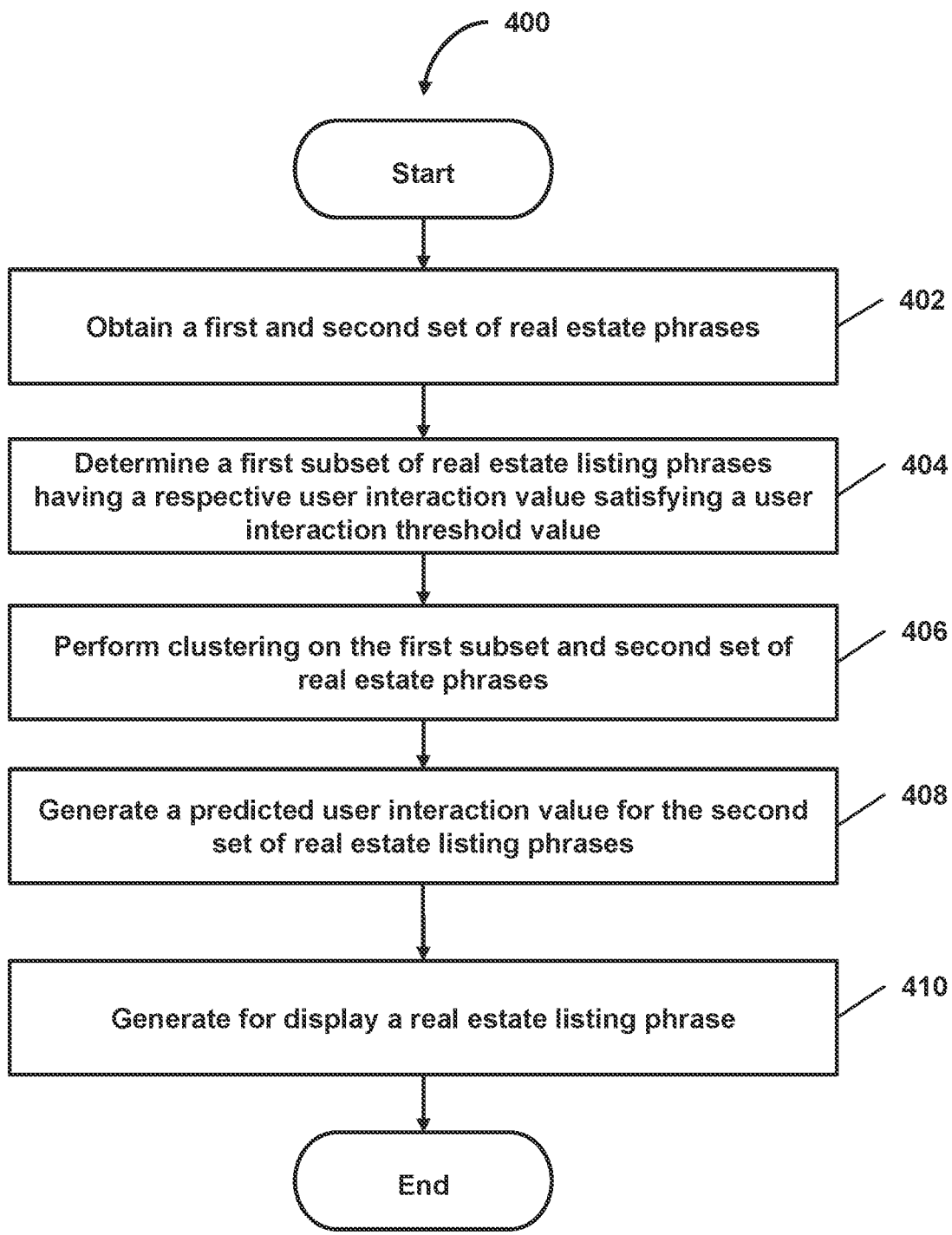
FIG. 4 is a flow diagram illustrating a process of rearranging real estate listing phrases associated with real estate listings displayed on a graphical user interface (GUI) of a computer system using known and unknown levels of user interaction information, in accordance with some implementations of the present technology.

FIG. 4 is a flow diagram illustrating a process of rearranging real estate listing phrases associated with real estate listings displayed on a graphical user interface (GUI) of a computer system using known and unknown levels of user interaction information, in accordance with some implementations of the present technology.

At act 402, process 400 obtains a first and second set of real estate phrases. For example, real estate phrases can be any phrase that is associated with describing real estate properties. In some implementations, the first set of real estate phrases are real estate tags indicating home attributes. For example, a real estate database can store real estate tags (or other real estate phrases) used to tag real estate listings. Such real estate tags are used to aid users (e.g., prospective customers, investors, real estate agents, realtors, etc.) with finding real estate properties. As such, real estate listings can be tagged with one or more real estate related tags.

In some implementations, the first set of real estate phrases are associated with a first geographic region. For example, each phrase of the first set of real estate phrases can each be associated with a geographic region. As an example, where the first set of phrases indicates "Water front," "clay shingle roof," and "stucco siding," such phrases can be associated with a geographic region such as Miami, Florida. The geographic region may indicate any geographic region such as a street, county, city, state, or country. Additionally, the geographic region may indicate a region that is based on geographic features such as a mountain range, a lake, an ocean, a river, or other geographic feature or geographic attraction.

Further to each real estate phrase of the first set of real estate phrases being associated with a first geographic region, each real estate phrase can also be associated with a known user interaction value. For instance, the known user interaction value can indicate a value or amount of user interactions associated with a real estate phrase. For example, the user interaction value can be an amount of webpage traffic (e.g., an amount of users visiting a webpage associated with a real estate phrase), an amount of clicks of a real estate listing that is associated with a given real estate phrase, an amount of saves of a real estate listing that is associated with a given real estate phrase, an amount of time spent viewing a real estate listing that is associated with a given real estate phrase, an amount of scrolling on a webpage associated with a respective real estate phrase, an amount of image searching (e.g., the amount of images a user clicks through or views) with respect to a real estate listing associated with a real estate phrase, or other webpage-traffic related user interaction value. For instance, such user interaction values can be determined by a server (e.g., server 210) and stored in a real estate database (e.g., database 215) for future retrieval. Additionally, such user interaction values can be determined by a server (e.g., server 210) monitoring data requests from one or more client devices (e.g., client device 205) interacting with a real estate database (e.g., database 215) via client devices Internet Protocol (IP) addresses and request message contents.

The second set of real estate phrases can also indicate one or more home attributes that are associated with a geographic region (e.g., the first geographic region, a second geographic region, etc.). In some implementations, the second set of real estate phrases are associated with the first geographic region (e.g., the same geographic region as the first set of real estate phrases), but are associated with an unknown user interaction value. For instance, with the existence of so many different real estate phrases that may indicate home attributes, some real estate phrases may not have a known interaction value. For example, a real estate database may store information related to real estate phrases a user has interacted with, however, not all real estate phrases may have been interacted with. Therefore, some real estate phrases are associated with a known interaction value, while others are not associated with a user interaction value (e.g., or associated with an unknown user interaction value). To provide an improved user experience via an improved user interface displaying real estate phrases for a user, as will be described, an estimated user interaction value can be determined for the second set of real estate phrases associated with the first geographic region to aid users in finding the most suitable real estate listings.

At act 404, process 400 determines a first subset of real estate listing phrases having a respective user interaction value satisfying a user interaction threshold value. For example, to tag or otherwise associate real estate listings with real estate listing phrases that are popular with respect to a given geographic region, process 400 can determine a first subset of real estate listing phrases from the first set of real estate listing phrases. For example, process 400 obtains, for each of the first set of real estate listing phrases, the interaction value associated with a respective real estate listing phrase and compare the respective interaction value to a user interaction threshold value.

In some implementations, interaction values have an interaction value type. For example, a user interaction value type can correspond to the type of interaction a user has with a real estate listing, such as, but not limited to an amount of webpage traffic, clicks, saves, time spent viewing, amount of scrolling, amount of image searching, or other interaction types. The user interaction threshold value can be a predetermined interaction threshold value. As an example, the predetermined interaction threshold value is a value such as an integer, percentage, ratio, or other value. For instance, the predetermined interaction threshold value can indicate a threshold level of user interaction such as a threshold amount of clicks of a real estate listing, an amount of saves of a real estate listing, an amount of time spent viewing a real estate listing, an amount of scrolling on a webpage, an amount of image searching (e.g., the amount of images a user clicks through or views) with respect to a real estate listing. Process 400 determines, for each real estate listing phrase of the first set of real estate listing phrases, whether the interaction value associated with the real estate listing phrase satisfies the predetermined interaction threshold value.

The interaction value can satisfy the predetermined interaction threshold value if the interaction value meets or exceeds the predetermined interaction threshold value. In other implementations, the interaction value can satisfy the predetermined interaction threshold value if the interaction value fails to meet or exceeds the predetermined interaction threshold value. In yet other implementations, where the predetermined interaction threshold value indicates a range of values, the interaction value can satisfy the predetermined interaction threshold value if the interaction value is within the predetermined interaction threshold value. It should be noted that one skilled in the art may appreciate other implementations of satisfying the predetermined interaction threshold value, in accordance with one or more implementations.

In one use case, where the interaction value indicates a number of clicks on a real estate listing associated with the real estate phrase "water front," a geographic region of Miami, Florida, and the interaction threshold value is 200 clicks, when the interaction value is 250 clicks, process 400 compares the interaction value to the interaction threshold value and determines that the interaction threshold value is satisfied. In another use case, where the interaction value indicates an amount of time spent scrolling on a real estate listing webpage associated with the real estate phrase "pool," a geographic region of San Diego, California, and the interaction threshold value is 20 seconds, when the interaction value (e.g., corresponding to an "amount of time spent scrolling" type) is 25 seconds, process 400 compares the interaction value to the interaction threshold value and determines that the interaction threshold value is satisfied.

In some implementations, the interaction value is determined based on a total amount of users interacting with a real estate listing in a given region that is associated with a real estate phrase. For example, a real estate database can store information related to real estate listing phrases that are associated with a geographic region (e.g., a location, address, GPS coordinates, city, country or other location information of a real estate property associated with a real estate listing). Additionally, the real estate database can store user interaction data associated with the real estate listing phrases that are associated with the geographic region. For example, real estate properties located in NYC, New York can be associated with real estate listing phrases such as "City Scape," "Street View" or other real estate phrases. When a user interacts with a real estate listing located in NYC, New York that is associated with "City Scape" or "Street View," the real estate database records user interaction information associated with users interacting with the real estate listing (e.g., amount of people clicking on the real estate listing associated with one or more of the real estate listing phrases, etc.). Process 400 determines, from the user interaction information associated with the real estate listings that include such real estate phrases with respect to a given geographic region that a certain amount of users have interacted with the real estate phrases. As an example, for a given geographic region of NYC, New York, process 400 can determine that out of all real estate listing located in NYC, New York, 97% of users have interacted with real estate listings associated with the real estate phrase of "City Scape."

Process 400 can generate (or otherwise determine) a first subset of real estate listing phrases having respective user interaction values satisfying the user interaction threshold value. In this way, the first subset of real estate listing phrases represents a set of "popular" real estate listing phrases with respect to a particular geographic region. For example, as described above, process 400 compares the user interaction value of each real estate phrase in the first set of real estate phrases to a user interaction threshold value to determine whether the user interaction value satisfies the user interaction threshold value. In response to the user interaction value satisfying the user interaction threshold value, process 400 generates a first subset of real estate listing phrases from the first set of real estate listing phrases that have an user interaction value that satisfies the user interaction threshold value.

In some implementations, process 400 compares user interaction values to corresponding user interaction threshold values. For example, as real estate listing phrases can be associated with one or more interaction value types (e.g., amount of webpage traffic, clicks, saves, time spent viewing, amount of scrolling, amount of image searching, or other interaction types), to determine whether the user interaction value satisfies a user interaction threshold value, process 400 can compare user interaction values to corresponding user interaction threshold values (e.g., of the same type). For example, process 400 can compare a user interaction value indicating an amount of clicks to a user interaction threshold value indicating an amount of clicks. Similarly, process 400 can compare a user interaction value indicating an amount of scrolling (e.g., on a real estate listing associated with a given phrase) to a user interaction threshold value indicating an amount of scrolling. It should be noted, that process 400 can compare other user interaction values to corresponding user interaction threshold values (e.g., such as they are the same type).

In some implementations, determining the first subset of real estate phrases is be based on a weighted average. For example, due to the different types of user interactions (e.g., amount of webpage traffic, clicks, saves, time spent viewing, amount of scrolling, amount of image searching, or other interaction types), to ensure that the first subset of real estate phrases reflect a popular set of real estate phrases corresponding to a region, process 400 can determine the first subset of real estate phrases based one or more interaction values satisfying corresponding interaction threshold values via a weighted average. For instance, each user interaction type can be associated with a predetermined weight. For example, a "save" is afforded more weight than a mere "click" (e.g., as a save may indicate that a real estate listing may be more popular as compared to a user simply clicking on the real estate listing). Thus, process 400 can determine a weighted average of the user interaction values that satisfy corresponding user interaction threshold values.

For example, a real estate listing phrase "Water Front" associated with a real estate listing located in Miami, Florida may be further associated with 700 clicks (e.g., on the real estate listing), an aggregated time (e.g., of all users) viewing the real estate listing of 40 minutes, and 200 saves (e.g., for future viewing) of the real estate listing. Process 400 first determines whether the user interaction values (e.g., the clicks, time viewing the real estate listing, and the saves of the real estate listing) satisfy corresponding interaction threshold values. For example, the clicks and saves may satisfy respective interaction threshold values, but the aggregated time spent viewing the real estate listing may not. Process 400 may determine a weighted average of all user interaction types. For example, the weighted average may be represented by WA=((W1)(UT1)*(W2)(UT2)* . . . *(WN)(UTN))/(W1+W2+ . . . +WN) where WN represents a weight corresponding to a particular User Interaction Type (UTN) and N represents an index associated with an amount of user interaction types.

At act 406, process 400 performs clustering on the first subset and second set of real estate phrases. For example, to determine (or otherwise estimate) user interaction information for real estate phrases that are associated with unknown user interaction data (e.g., user interaction values, a level of webpage traffic, or other user interaction-related information), process 400 can perform clustering on the first subset of real estate phrases (e.g., the set of real estate phrases associated with known user interaction values) and the second set of real estate phrases (e.g., the set of real estate phrases associated with unknown user interaction values) to determine real estate phrases of the second set of real estate phrases that are similar to the first subset of real estate phrases. For example, similar real estate phrases may indicate real estate phrases that are semantically similar to one another. For instance, the real estate phrases "Water Front" and "Lake Front" may be semantically similar. However, in some instances, the real estate database may only have user interaction values (or other user interaction data) associated with "Water Front" but not "Lake Front." Thus, to provide users with an improved user experience via an improved user interface, as will later be explained, process 400 estimates user interaction values for real estate listing phrases that are not associated with a known user interaction value.

For instance, process 400 performs clustering on the first subset of real estate listing phrases and the second set of real estate listing phrases to generate a set of clusters. Each cluster of the set of clusters can represent a cluster of similar real estate phrases. As an example, process 400 provides the first subset of real estate listing phrases and the second set of real estate listing phrases to a machine learning model to generate a set of real estate listing phrase clusters. The machine learning model can be any machine learning model configured to perform a clustering algorithm such as a K-Nearest-Neighbor (KNN) model, K-means model, Density-based Spatial Clustering (DBSCAN) model, Gaussian Mixture Model, Balance Iterative Reducing and Clustering using Hierarchies (BIRCH) model, Affinity Propagation clustering model, Mean-Shift clustering model, Ordering Points to Identify the Clustering Structure (OPTICS) model, Agglomerative Hierarchy clustering model, Divisive Hierarchical clustering model, Mini-Batch K-means model, or other machine learning model. In some implementations, the first subset of real estate listing phrases and the second set of real estate listing phrases may indicate a vector embedding of raw real estate listing phrases. For example, as described in process 300 of FIG. 3, at least some of the first subset and second set of real estate listing phrases may correspond to one or more vector embedded real estate listing phrases. In such a case, process 400 performs clustering on the vector embeddings of the real estate listing phrases to generate a set of clusters indicating semantically similar real estate clusters. In other implementations, process 400 performs clustering on the real estate phrases themselves (e.g., non-vector embedded real estate phrases).

Figure 5:
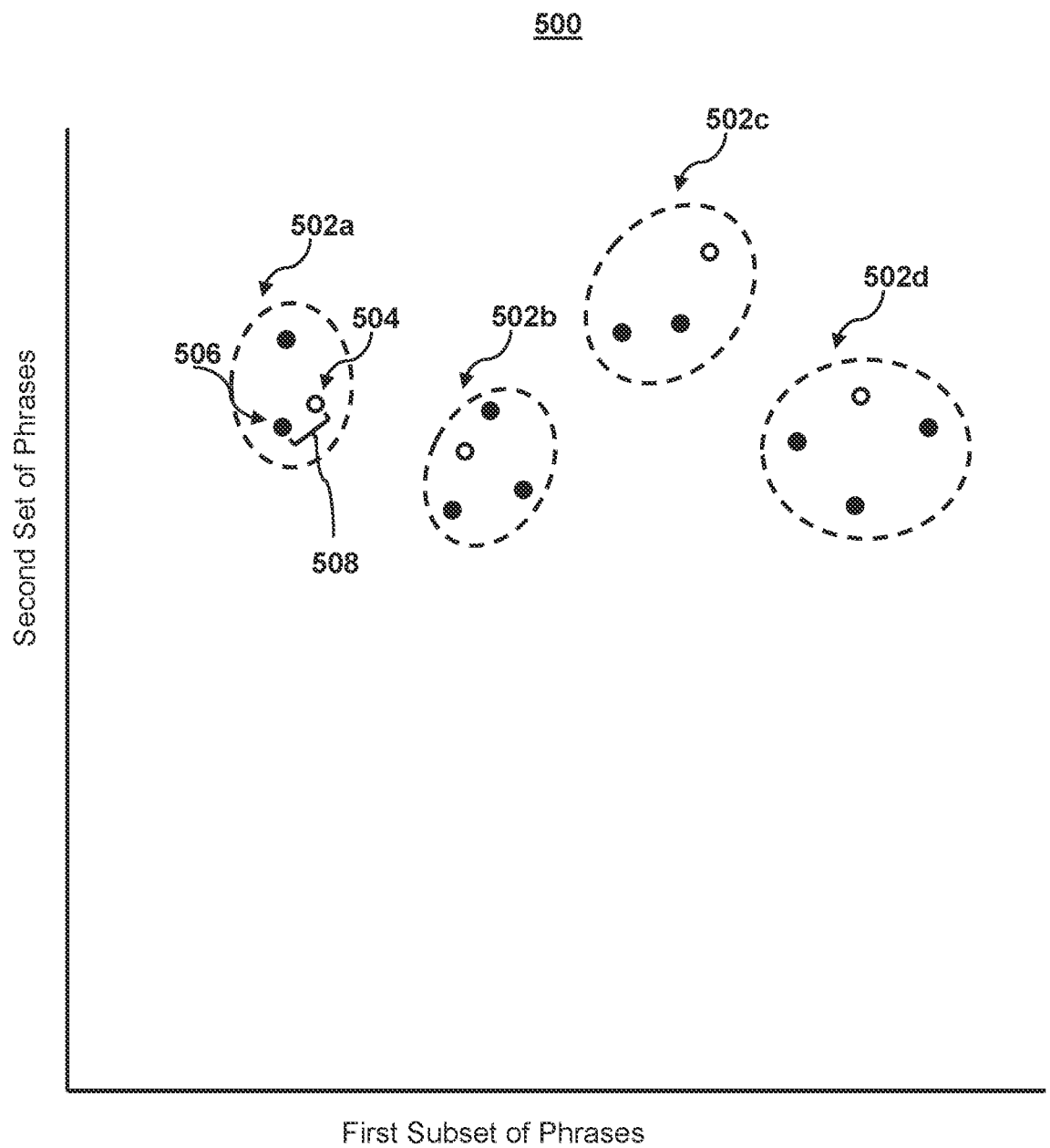
FIG. 5 shows a graph illustrating clustering of real estate listing phrases, in accordance with some implementations of the present technology.

As shown in FIG. 5, a machine learning model can generate a set of real estate listing phrase cluster(s) 502 that indicate semantically similar real estate listing phrases. Each real estate listing phrase cluster 502 can include one or more real estate listing phrases. For example real estate listing phrase cluster 502a includes one or more real estate listing phases. For instance, real estate listing phrase 504 may indicate a real estate listing phrase from the first subset of real estate listing phrases (e.g., real estate listing phrases that are associated with known user interaction data) and one or more real estate listing phrases 506 from the second set of real estate listing phrases (e.g., real estate listing phrases that are associated with unknown user interaction data). To estimate user interaction data for the second set of real estate listing phrases, process 400 performs clustering on the first subset and the second set of real estate listing phrases to determine clusters of semantically similar real estate listing phrases. For example, real estate listing phrase 504 may indicate a real estate listing phrase of "Water Front" while real estate listing phrase 506 may indicate a real estate listing phrase of "Ocean Front." A real estate database may include information related to user interactions of real estate listings associated with "Water Front" but not "Ocean Front." Therefore, to improve the user experience by tagging or otherwise associating real estate phrases to real estate listing located in a geographic region, process 400 determines clusters of semantically similar real estate listing phrases.

Referring back to FIG. 4, at act 408, process 400 generates predicted user interaction values for the second set of real estate listing phrases. For instance, estimating user interaction values for the second set of real estate listing phrases is advantageous to reduce the amount of computer processing resources required when generating suggested real estate listings for a user with respect to a given geographic region. For example, by associating popular real estate phrases with a real estate listings within a given region (e.g., where such real estate listings include a popular real estate phase in the real estate listing description), when a user is browsing through real estate listings, the user can easily identify real estate listings of interest as opposed to requiring the generation of unpopular real estate listings. Therefore, process 400 generates predicted (e.g., estimated) user interaction values for real estate listing phrases associated with unknown user interaction data.

In some implementations, process 400 generates a predicted user interaction value for each real estate listing phrase of the second set of real estate listing phrases based on a respective distance and a known user interaction value. For example, process 400 can generate such predicted user interaction values based on (i) a distance between a real estate listing phrase of the second set of real estate phrases and a respective real estate listing phrase of the first subset of real estate phrases with respect to a given cluster and (ii) the user interaction value associated with the respective real estate listing phrase of the first subset of real estate listing phrases. In one use case, where real estate listing phrase 504 represents a real estate listing phrase of the first subset of real estate listing phrase and real estate listing phrase 506 represents a real estate listing phrase of the second set of real estate listing phrase, process 400 determines a distance 508 between real estate listing phrase 506 and real estate listing phrase 504. In some implementations, distance 508 may represent a cosine distance between real estate phrase 506 and real estate phrase 504 with respect to real estate cluster 502a. It should be noted, that process 400 determines distance 508 between each real estate listing phrase of the second set of real estate listing phrases and each real estate listing phrase of the first subset of real estate listing phrases with respect to a cluster in which the real estate phrases are within. In this way, distance 508 represents a semantic-similarity value between the real estate phrase associated with a known interaction value and a real estate phrase associated with an unknown interaction value. To clarify, distance 508 may indicate how similar (semantically) one real estate phrase is to another.

Referring to FIG. 6, FIG. 6 shows an example output of semantic-similarities between real estate phrases. For example, 'phrase 1' may correspond to real estate phrase 504 of FIG. 5, while 'phrase_2' may correspond to real estate listing phrase 506 of FIG. 5. Additionally, the similarity column may indicate respective distances (e.g., distance 508 of FIG. 5). For instance, using the similarity values obtained from process 400 determining the cosine distance between real estate phrases associated with unknown user interaction data and real estate phrases associated with known user interaction data may be used to determine predicted user interaction data for real estate phrases associated with unknown user interaction data.

For example, subsequent to the clustering of the first subset of real estate listing phrases and the second set of real estate listing phrases, process 400 determines the distances between each real estate listing phrase of the second set of real estate listing phrase with respect to the "most similar" real estate listing phrase of the first subset of real estate listing phrase within a given cluster. For example, the distances are stored in a real estate database in association with each real estate listing phrase of the second set of real estate listing phrases. For instance, where real estate listing phrase 504 represents a real estate listing phrase of the first subset of real estate phrases (e.g., associated with known user interaction data) and real estate listing phrase 506 represents a real estate listing phrase of the second set of real estate listing phrases, process 400 can store the distance 508 in association with real estate listing phrase 506 in the real estate database.

Once the distances have been obtained and stored in the real estate database, process 400 uses each distance and known user interaction data to estimate user interaction data for real estate listing phrases associated with unknown user interaction data. For instance, such predicted user interaction data can be predicted via $$T_{traffic} = \frac{G_{traffic1}}{dist(G, T)} + \frac{G_{traffic2}}{dist(G, T)} + ... \frac{G_{trafficN}}{dist(G, T)}$$

where, $T_{traffic}$ represents a predicted user interaction value, $G_{trafficN}$ represents a type of user interaction, and dist(G, T) represents a respective distance between a real estate listing phrase associated with known interaction data and a real estate listing phrase associated with unknown user interaction data. For example, the real estate listing phrase associated with known user interaction data may be the most similar real estate listing phrase with respect to the real estate listing phrase associated with unknown user interaction data. Process 400 uses such process to predict user interaction data (e.g., a user interaction value).

In some implementations, the predicted user interaction data represents a real estate listing phrase interaction score. For example, to consider each type of user interaction value, process 400 can generate a customized score to reflect a compilation of each type of user interaction value that may be associated with a real estate phrase of the first subset of real estate phrases with respect to a given cluster. For example, where real estate listing phrase 504 is a real estate listing phrase of the first subset of real estate listing phrases and is associated with known user interaction data of user interaction types (i) amount of clicks and (ii) amount of saves, process 400 generates a real estate listing phrase interaction score for real estate listing phrase 506 (where real estate listing phrase 506 is a real estate listing phrase of the second set of real estate listing phrases associated with a unknown user interaction data) based on distance 508 and the known user interaction data of real estate listing phrase 504. For instance, the real estate listing phrase interaction score can be represented by $$T_{traffic} = \frac{G_{traffic1}}{dist(G, T)} + \frac{G_{traffic2}}{dist(G, T)}$$

where $G_{traffic1}$ represents the amount of clicks, $G_{traffic2}$ represents the amount of saves, and dist(G, T) represents distance 508. In this way, the real estate listing phrase interaction score estimates user interaction data for real estate listing phrases with unknown user interaction data.

In some implementations, process 400 merges the first subset of real estate phrases and the second set of real estate listing phrases. For example, process 400 can merge the first subset of real estate listing phrases (e.g., associated with known user interaction data) and the second set of real estate listing phrases (e.g., associated with predicted user interaction data) to generate a final set of real estate listing phrases. The final set of real estate listing phrases is then ranked based on each real estate listing phrase's user interaction data (e.g., whether known user interaction data or predicted user interaction data).

As an example, each real estate listing phrase of the final set of real estate listing phrases can be ranked based on the real estate listing phrase interaction score. For example, each real estate listing phrase of the final set of real estate phrases may be associated with either a known user interaction score (e.g., obtained via the first subset of real estate listing phrases) or a predicted user interaction score (e.g., estimated for the real estate listing phrases of the second set of real estate phrases associated with unknown user interaction data). Process 400 ranks each real estate listing phrase of the final set of real estate listing phrases in a descending order based on the respective real estate phrase interaction score.

In some implementations, process 400 selects from the final set of ranked real estate listing phrases, the real estate listing phrase that is associated with the highest real estate phrase interaction score. For example, process 400 can compare each real estate listing phrase of the final set of real estate listing phrases to one another to determine which real estate listing phrase of the final set of real estate listing phrases has the highest real estate phrase interaction score. In this way, the selected real estate listing phrase represents the most popular real estate listing phrase with respect to a given geographic region.

At act 410, process 400 generates for display a real estate listing phrase. For example, process 400 can use the selected real estate phrase from the ranked final set of real estate listing phrases to be displayed on a graphical user interface (GUI) in association with a real estate listing associated with the geographic area. For instance, the selected real estate listing phrase may be displayed on a real estate listing photocard (e.g., thumbnail image) of a real estate listing, an image of a real estate listing, in a portion of a real estate listing description, or otherwise displayed in association with a real estate listing.

As an example, the real estate listing photocard may visually appear to a user on a real estate listing search-result user interface. As such, by displaying the selected real estate phrase on the real estate listing photocard, users can quickly identify real estate listings of interest as opposed to manually clicking on each real estate listing to read through the real estate listing description. That is, opposed to conventional systems merely displaying real estate phrases in a real estate listing description, process 400 rearranges the location of the real estate listing phrase from the real estate listing description to the real estate listing photocard to improve the user experience via an improved GUI.

As another example, a portion of the real estate listing description can also include the selected real estate phrase. For instance, as the real estate listing phrase may be embedded in a real estate listing description paragraph (e.g., a paragraph describing the real estate listing), such phrase may be difficult to identify. Therefore, process 400 can generate for display the selected real estate listing phrase in a portion of the real estate listing description. For example, the portion may be separate from the real estate listing paragraph (e.g., spatially separate, visually separate, etc.). In some implementations, the selected real estate listing phrase displayed in the portion of the real estate listing description can have a different textual characteristic as compared to the real estate listing description paragraph. For example, the selected real estate listing phrase may be bolded, underlined, italicized, highlighted, or other textual characteristic. In this way, the user experience is improved as the user may easily identify the most popular or otherwise important real estate listing phrases are associated with the real estate listing.

In some implementations, process 400 obtains real estate listings from a real estate database that are associated with the geographic area and that include (or otherwise associated with) the selected real estate phrase. For example, where the geographic area is Orlando, Florida, the selected real estate phrase indicates "Water Front," process 400 can obtain, from the real estate database, one or more real estate listing corresponding to the geographic region of Orlando, Florida and that are located on the water. For instance, each real estate listing in the real estate database can include real estate-related information indicating a location (e.g., a geographic region), a real estate listing description (e.g., indicating a description of the real estate properties attributes or features), one or more images related to the real estate property, or other real estate-related information. Process 400 can parse through the real estate-related information of the real estate listings stored in the real estate database (e.g., by using a Natural Language Processing model or other machine learning model) to obtain real estate listings that correspond to the geographic region and are associated with the selected real estate phrase. In response to obtaining the real estate listings that correspond to the geographic region and are associated with the selected real estate phrase, process 400 generates for display the selected real estate phrase in association with the real estate listings.

In particular, where the selected real estate listing phrase is generated for display on a real estate listing photocard (e.g., a thumbnail image of the real estate property), the user experience is improved via an improved user interface as such real estate listing phrases may be rearranged (e.g., from the real estate listing description among multiple real estate listing phrases)—thereby allowing users to easily identify real estate listings that are of interest to the user and that are associated with "popular" home attributes with respect to a given geographic region. This in turn also reduce the amount of computer processing resources and computer memory required as users need not scroll through multiple real estate listings (thereby requiring generation of such real estate listings) that are not suitable or popular to the users searching real estate listings in a given geographic region.

Exemplary Pipeline

Figure 7:
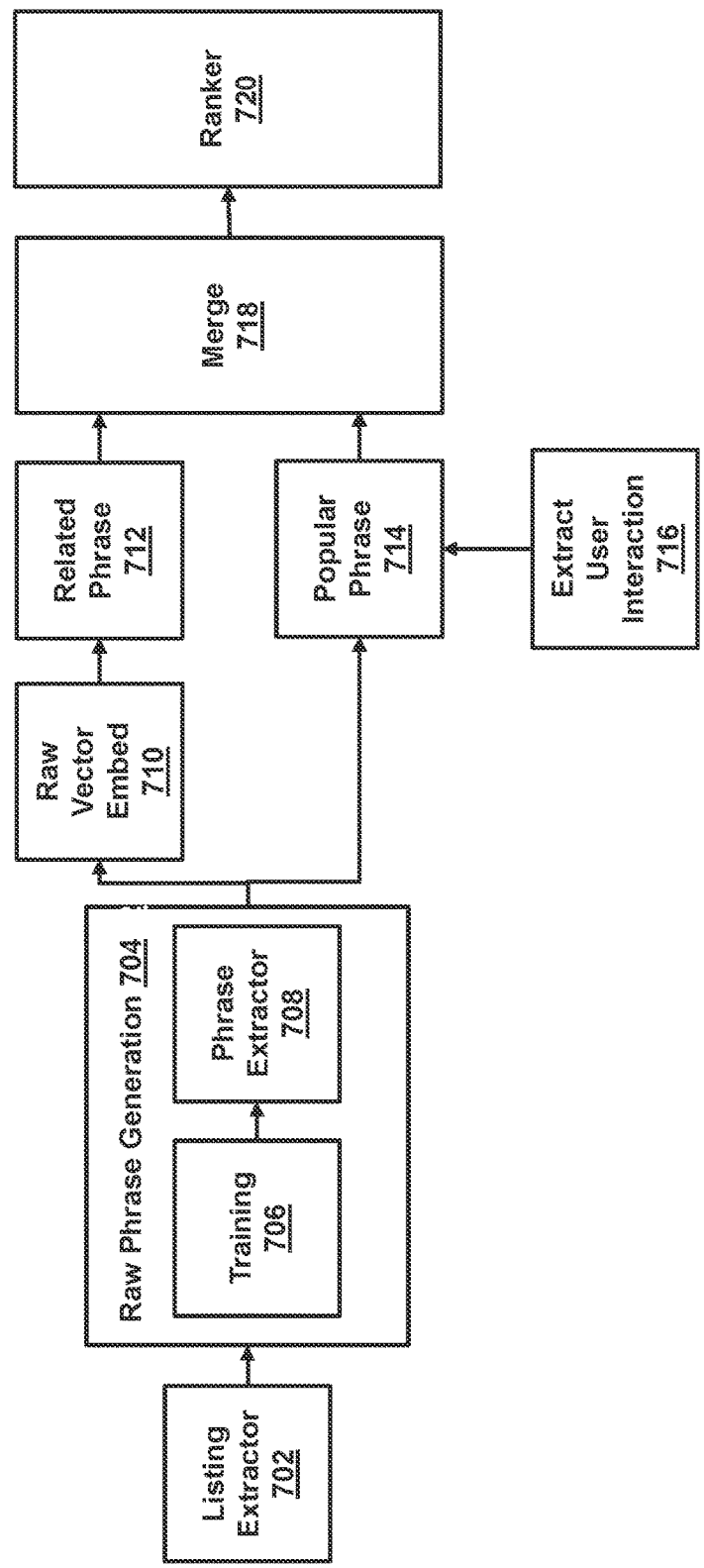
FIG. 7 is a block diagram showing some of the components used to provide real estate phrases facilitating improvements in real estate-related user interfaces based on known and unknown levels of webpage traffic, in accordance with some implementations of the present technology.

FIG. 7 shows some of the components used to provide real estate phrases facilitating improvements in real estate-related user interfaces based on known and unknown levels of webpage traffic, in accordance with some implementations of the present technology. For instance, FIG. 7 shows an exemplary pipeline diagram of the processes used, in accordance with one or more implementations.

In some implementations, Listing Extractor Module 702 can perform the same or similar act as act 302. Raw Phrase Generation module 704 can perform the same or similar act as act 304. Raw Vector Embed module 710 can perform the same or similar act as act 306. Extract User Interaction module 716 and Popular Phrase module 714 can perform the same or similar act as act 404. Related Phrase module 712 can perform the same or similar act as act 406. Merge module 718 can perform the same or similar act as act 408. Ranker module 720 can perform the same or similar act as act 410.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for rearranging tags associated with a real estate listing photocard displayed on a graphical user interface (GUI) of a computer system using known and unknown levels of webpage traffic, the system comprising:
   at least one processor;
   a remote data store storing:
      a first set of real estate listing tags, wherein each tag of the first set of real estate listing tags indicates a home attribute and is associated with (i) a geographic region and (ii) an known level of webpage traffic;
      a second set of real estate listing tags, wherein each tag of the second set of real estate listing tags indicates a home attribute and is associated with (i) the geographic region and (ii) an unknown level of webpage traffic; and
   at least one memory coupled to the at least one processor and storing instructions that, when executed by the at least one processor, perform operations comprising:
      accessing the remote data store to obtain (i) the first set of real estate listing tags and (ii) the second set of real estate listing tags;
      comparing, for each of the first set of real estate listing tags, the known level of webpage traffic to a threshold level of webpage traffic, to determine whether the respective known level of webpage traffic meets or exceeds the threshold level of webpage traffic;
      generating a set of popular real estate listing tags, from the first set of real estate listing tags, by selecting known real estate listing tags from the first set of known real estate listing tags having a respective known level of webpage traffic meeting or exceeding the threshold level of webpage traffic;
      performing clustering, by a K-Nearest-Neighbor algorithm, using the set of popular real estate listing tags and the second set of real estate listing tags, to determine a set of clusters, wherein each cluster of the set of clusters indicates semantically similar real estate listing tags, and wherein each cluster of the set of clusters includes at least one of the popular real estate listing tags of the set of popular real estate listing tags and one or more real estate listing tags of the second set of real estate listing tags;
      for each cluster of the set of clusters:
         generating a cosine similarity distance value between (i) each of the real estate listing tags of the second set of real estate listing tags and (ii) a popular real estate listing tag included in the respective cluster;
         determining, for each of real estate listing tag of the second set of real estate listing tags, an estimated level of webpage traffic based on (i) the cosine similarity distance value and (ii) the level of known webpage traffic of the popular real estate listing tag included in the respective cluster;
      generating a final set of real estate tags by merging the second set of real estate listing tags with the set of popular real estate listing tags;
      ranking each real estate listing tag of the final set of real estate listing tags, in descending order, based on the respective level of known or estimated webpage traffic associated with the respective real estate listing tag;
      selecting, from the final set of ranked real estate listing tags, a real estate listing tag having the highest level of known or estimated webpage traffic as compared to all other ranked real estate listing tags of the final set of ranked real estate listing tags; and
      generating, for display, on a real estate listing photocard, the selected real estate listing tag based on the determined level of known or estimated webpage traffic, wherein the real estate listing photocard is associated with a real estate listing that corresponds to the geographic region.

2. The system of claim 1, wherein the remote data store further stores a set of real estate listing descriptions associated with the geographic region, and wherein the instructions when executed by the at least one processor further perform operations comprising:
   access the remote data store to obtain the set of real estate listing descriptions associated with the geographic region;
   generate a set of raw real estate listing tags, based on the set of real estate listing descriptions associated with the geographic region, using a collocation detection model, wherein each raw real estate listing tag of the set of raw real estate listing tags is a bigram or trigram real estate listing tag;

generate, a vector embedding for each raw real estate listing tag of the set of raw real estate listing tags, using a vector embedding model, wherein each vector embedding is associated with contextual information indicating home attribute information of the respective raw real estate listing tag; and using the vector embedding for each raw real estate listing tag of the set of raw real estate listing tags as the second set of real estate listing tags.

3. The system of claim 2, wherein the instructions when executed by the at least one processor further perform operations comprising:

training the collocation detection model on a second set of real estate listing descriptions, wherein each real estate listing description of the second set of real estate listing descriptions are associated with different geographic regions.

4. The system of claim 1, wherein the known level of webpage traffic indicates an amount of (i) clicks, (ii) saves, (iii) time spent viewing, or (iii) scrolling on a webpage associated with a respective real estate listing tag of the first set of real estate listing tags.

5. A method for rearranging real estate phrases associated with a real estate listing displayed on a graphical user interface (GUI) of a computer system using known and unknown user interaction information comprising:

accessing a remote data store to obtain (i) a first set of real estate listing phrases each associated with a predetermined user interaction value, and (ii) a second set of real estate listing phrases each associated with an unknown user interaction value;

determining a first subset of real estate listing phrases from the first set of real estate listing phrases having a respective user interaction value satisfying a user interaction threshold value;

using a machine learning model to perform clustering on the first subset of real estate listing phrases and the second set of real estate listing phrases to generate a set of clusters, wherein each cluster of the set of clusters represent a cluster of similar real estate phrases;

generating a predicted user interaction value for each real estate listing phrase of the second set of real estate listing phrases based on (i) a distance between a respective real estate listing phrase of the second set of real estate phrases and a respective real estate listing phrase of the first subset of real estate listing phrases with respect to a given cluster of the set of clusters and (ii) the predetermined user interaction value associated with the respective predetermined real estate listing phrase; and generating, for display on a GUI, in association with a real estate listing, a real estate listing phrase of the first subset of real estate listing phrases and the second set of real estate listing phrases having the highest predicted or predetermined user interaction value than all other real estate listing phrases of the first subset of real estate listing phrases or the second set of real estate listing phrases.

6. The method of claim 5, further comprising:

accessing the remote data store to obtain a set of real estate listing descriptions associated with a geographic region;

generate a set of raw real estate listing phrases, based on the set of real estate listing descriptions associated with the geographic region, using a second machine learning model;

generate, a vector embedding for each raw real estate listing phrase of the set of raw real estate listing phrases, using a third machine learning model, wherein each vector embedding is associated with contextual information indicating home attribute information of the respective raw real estate listing phrase; and using the vector embedding for each raw real estate listing phrase of the set of raw real estate listing phrases as the second set of real estate listing phrases.

7. The method of claim 6, further comprising:

training the second machine learning model on a second set of real estate listing descriptions, wherein each real estate listing description of the second set of real estate listing descriptions are associated with different geographic regions.

8. The method of claim 7, wherein the second machine learning model is a Bidirectional Encoder Representations from Transformers (BERT) model.

9. The method of claim 5, wherein the predetermined user interaction value indicates an amount of (i) clicks, (ii) saves, (iii) time spent viewing, or (iv) scrolling on a webpage associated with a respective real estate listing phrase of the first set of real estate listing phrases.

10. The method of claim 5, wherein the generating, for display on the GUI, in association with a real estate listing, a real estate listing phrase of the first subset of real estate listing phrases and the second set of real estate listing phrases, further comprises:

accessing the remote data store to obtain a set of real estate listings, wherein each real estate listing of the set of real estate listings are associated with a real estate listing description;

identifying, based on the real estate listing descriptions of set of real estate listings, at least one real estate listing having the real estate listing phrase included in the respective real estate listing description; and generating, for display, the real estate listing phrase on a primary image associated with the real estate listing.

11. The method of claim 5, wherein the machine learning model is a K-Nearest-Neighbor machine learning model.

12. The method of claim 5, wherein the predetermined user interaction values of the first set of real estate listing phrases are obtained via one or more data aggregation resources.

13. One or more non-transitory computer-readable media comprising instructions that, when executed by one or more processors, cause operations comprising:

accessing a remote data store to obtain (i) a first set of real estate listing phrases each associated with a predetermined user interaction value and (ii) a second set of real estate listing phrases each associated with an unknown user interaction value;

determining a first subset of real estate listing phrases from the first set of real estate listing phrases having a respective user interaction value satisfying a user interaction threshold value;

using a machine learning model to perform clustering on the first subset of real estate listing phrases and the second set of real estate listing phrases to generate a set of clusters, wherein each cluster of the set of clusters represent a cluster of similar real estate phrases;

generating a predicted user interaction value for each real estate listing phrase of the second set of real estate listing phrases based on (i) a distance between a respective real estate listing phrase of the second set of real estate phrases and a respective real estate listing phrase of the first subset of real estate listing phrases with respect to a given cluster of the set of clusters and (ii) the predetermined user interaction value associated with the respective predetermined real estate listing phrase; and generating, for display on a GUI, in association with a real estate listing, a real estate listing phrase of the first subset of real estate listing phrases and the second set of real estate listing phrases having the highest predicted or predetermined user interaction value than all other real estate listing phrases of the first subset of real estate listing phrases or the second set of real estate listing phrases.

14. The media of claim 13, the operations further comprising:

accessing the remote data store to obtain a set of real estate listing descriptions associated with a geographic region;

generate a set of raw real estate listing phrases, based on the set of real estate listing descriptions associated with the geographic region, using a second machine learning model;

generate, a vector embedding for each raw real estate listing phrase of the set of raw real estate listing phrases, using a third machine learning model, wherein each vector embedding is associated with contextual information indicating home attribute information of the respective raw real estate listing phrase; and using the vector embedding for each raw real estate listing phrase of the set of raw real estate listing phrases as the second set of real estate listing phrases.

15. The media of claim 14, the operations further comprising:

training the second machine learning model on a second set of real estate listing descriptions, wherein each real estate listing description of the second set of real estate listing descriptions are associated with different geographic regions.

16. The media of claim 15, wherein the second machine learning model is a Bidirectional Encoder Representations from Transformers (BERT) model.

17. The media of claim 13, wherein the predetermined user interaction value indicates an amount of (i) clicks, (ii) saves, (iii) time spent viewing, or (iv) scrolling on a webpage associated with a respective real estate listing phrase of the first set of real estate listing phrases.

18. The media of claim 13, wherein the generating, for display on the GUI, in association with a real estate listing, a real estate listing phrase of the first subset of real estate listing phrases and the second set of real estate listing phrases, the operations further comprising:

accessing the remote data store to obtain a set of real estate listings, wherein each real estate listing of the set of real estate listings are associated with a real estate listing description;

identifying, based on the real estate listing descriptions of set of real estate listings, at least one real estate listing having the real estate listing phrase included in the respective real estate listing description; and generating, for display, the real estate listing phrase on a primary image associated with the real estate listing.

19. The media of claim 13, wherein the machine learning model is a K-Nearest-Neighbor machine learning model.

20. The media of claim 13, wherein the predetermined user interaction values of the first set of real estate listing phrases are obtained via one or more data aggregation resources.

* * * * *